United States Patent [19]
Blain et al.

[11] Patent Number: 5,770,009
[45] Date of Patent: Jun. 23, 1998

[54] ALIGNMENT DEVICES FOR FITMENT APPLICATION MACHINE AND METHOD THEREOF

[75] Inventors: Gerald M. Blain, Los Gatos; Reynaldo F. Medel, Milpitas, both of Calif.

[73] Assignee: Portola Packaging, Inc., San Jose, Calif.

[21] Appl. No.: 740,760

[22] Filed: Nov. 1, 1996

Related U.S. Application Data

[63] Continuation-in-part of Ser. No. 317,561, Oct. 4, 1994, Pat. No. 5,601,669.

[51] Int. Cl.$^6$ ................................................. B32B 31/16
[52] U.S. Cl. ................. 156/580.1; 156/73.1; 425/174.2; 493/87; 493/213
[58] Field of Search ......................... 156/69, 73.1, 580.1, 156/580.2; 264/442, 443, 445; 425/174.2; 493/213, 214, 929, 87

[56] References Cited

U.S. PATENT DOCUMENTS

| | | | |
|---|---|---|---|
| 4,566,928 | 1/1986 | Rausing | 156/217 |
| 4,604,850 | 8/1986 | Reil | 53/423 |
| 4,788,811 | 12/1988 | Kawajiri et al. | 53/426 |
| 4,909,434 | 3/1990 | Jones et al. | 229/125.15 |
| 4,964,562 | 10/1990 | Gordon | 229/125.15 |
| 5,058,360 | 10/1991 | Yamazaki et al. | 53/133.2 |
| 5,174,465 | 12/1992 | Luch et al. | 220/288 |
| 5,203,819 | 4/1993 | Gleason | 53/133.2 |
| 5,219,320 | 6/1993 | Abrams et al. | 493/8 |
| 5,249,695 | 10/1993 | Luch et al. | 220/276 |
| 5,272,855 | 12/1993 | Togi et al. | 53/410 |
| 5,304,265 | 4/1994 | Keeler et al. | 156/64 |
| 5,484,374 | 1/1996 | Bachner et al. | 493/87 |
| 5,601,669 | 2/1997 | Moody et al. | 156/73.1 |
| 5,620,542 | 4/1997 | Avila et al. | 156/73.1 |
| 5,653,832 | 8/1997 | Thompson et al. | 156/73.1 |

FOREIGN PATENT DOCUMENTS 2 645 503 of 0000 France.

*Primary Examiner*—James Sells
*Attorney, Agent, or Firm*—Julian Caplan; Flehr Hohbach Test Albritton & Herbert LLP

[57] ABSTRACT

As an open upper end apertured panel carton is conveyed to the fitment application stage of a filling line, a ramp raises the carton to a predetermined elevation. A rotary anvil having spuds on which fitments are applied which lowers a fitment inside the carton is indexed into precise angular position by an apertured collar fixed to the anvil sleeve, mating with a stationary pin. The sleeve on which the anvil is mounted is moved longitudinally so that the spout end of the fitment extends out through the aperture in the carton panel and a peripheral flange on the opposite end of the fitment engages the inside of the apertured panel. As a welding horn moves into position, extending fingers engage the loading and trailing sides of the carton to horizontally align the carton. Thus the aperture in the carton is vertically and horizontally aligned and the fitment is aligned with the aperture in the carton. The fitment flange is welded to the interior of the carton.

17 Claims, 5 Drawing Sheets

ALIGNMENT DEVICES FOR FITMENT APPLICATION MACHINE AND METHOD THEREOF

CROSS REFERENCE TO RELATED APPLICATIONS

This application is a continuation-in-part of application Ser. No. 08/317,561, filed Oct. 4, 1994, now U.S. Pat. No. 5,601,669 issued Feb. 11, 1997, entitled Apparatus and Method for Attaching Fitness to Cartons.

BACKGROUND OF THE INVENTION

1. Field of the Invention

This invention relates to a new and improved device for a fitment application machine and to the method of operation thereof. More particularly, the invention relates to means for such a machine which accurately align the carton to which the fitment is to be applied, both vertically and horizontally as it is delivered to the fitment application station of a liquid filler line and further to means for accurately positioning the fitment relative to the carton and to the welding horn of the application machine.

2. Description of Related Art

Fitments of the type of the present invention are subject to wide variation. Preferred fitments are shown in U.S. Pat. Nos. 5,174,465; 5,249,695; 5,271,519; 5,303,837; 5,348,184 and in U.S. patent application Ser. No. 08/380,832 filed Jan. 30, 1995 now abandoned, and continuation Ser. No. 08/808,682, filed Feb. 28, 1997. Such fitments are inserted into the inside of an open ended carton formed with an aperture in one panel thereof and are moved horizontally so that the spout end of the fitment projects through the hole in the carton. Whereupon a welding head is applied to the exterior of the carton to weld an internal flange of the fitment to the carton. Such a machine is illustrated and described in Bachner U.S. Pat. No. 5,484,374.

SUMMARY OF THE INVENTION

Fitments used with the present invention are subject to considerable variation. Essentially, such fitments have a peripheral flange at one end and a spout projecting upwardly thereof and are usually closed with a cap. The structure of such fitment is subject to wide variation. A preferred fitment is shown in U.S. patent application Ser. No. 08/380,832 filed Jan. 30, 1995, but it will be understood that many other fitments may be used. The fitment is applied to a conventional tent type carton having a top panel formed with an aperture dimensioned so that the spout of the fitment projects outward from the interior of the carton through the aperture and the flange is welded to the interior thereof.

Standard filling machines advance cartons intermittently horizontally in line on a conveyor from a carton depositing station (which may be preceded by a carton setup station), thence through the fitment application station which comprises the present invention and thence to filling and closing stations. As the cartons move toward the application station, they are advanced on a conveyor, which again is subject to wide variation in structure, substantially horizontally. Fitments are delivered from a hopper to a chute which leads to a fitment box on the top of the present station. Extending transversely of the direction of movement of the conveyors is a horizontally reciprocable shaft positioned perpendicular to the direction of movement of the cartons. Mounted on the shaft is an anvil having radially projecting arms on the outer end of each of which is a spud. When a spud is uppermost, a fitment is deposited thereon from the fitment box and is carried down as the shaft rotates in timed relation to the movement of the conveyor until the fitment is deposited inside the open end of the box substantially in alignment with the hole in the carton panel. Thereupon the anvil reciprocates so that the spout of the fitment is projected out through a hole in a carton panel. A welding head engages the exterior of the carton and the flange of the fitment is clamped between the anvil and the welding horn until a weld of the flange of the fitment to the carton is completed preferably ultrasonically. The anvil is then reciprocated away from the carton panel as is the welding horn and as the anvil rotates the carton proceeds along the conveyor to the filling and closing stations.

The present invention relates to devices which accurately position the fitment relative to the hole in the carton. One such device is a ramp which engages the bottom of the carton as it advances along the conveyor and elevates the carton so that the hole in the carton is at a predetermined elevation.

Another feature of the invention is the provision of outward extending fingers on the carriage of the welding horn which engage the leading and trailing sides of the carton and thereby align the carton horizontally.

A still further alignment feature is the use of a pin fixed relative to the frame of the machine which engages a hole in an apertured disk which rotates with the anvil and aligns the spud carrying the fitment in a vertically downmost position so that it is exactly at the level of the hole in the carton.

Accordingly it is a principal purpose and advantage of the present invention to accurately position the fitment and carton relative to each other so that accurate welding of the fitment is accomplished.

By reason of the fact that all of the necessary elements are accurately aligned, the present invention enables the application station of the machine to be operated more rapidly.

Still another feature of the invention is the fact that improper welds of the fitment to the carton are decreased.

DESCRIPTION OF THE DRAWINGS

The accompanying drawings, which are incorporated in and form a part of is specification, illustrate embodiments of the invention and, together with the description serve to explain the principles of the invention.

DESCRIPTION OF PREFERRED EMBODIMENT

Figure 1:
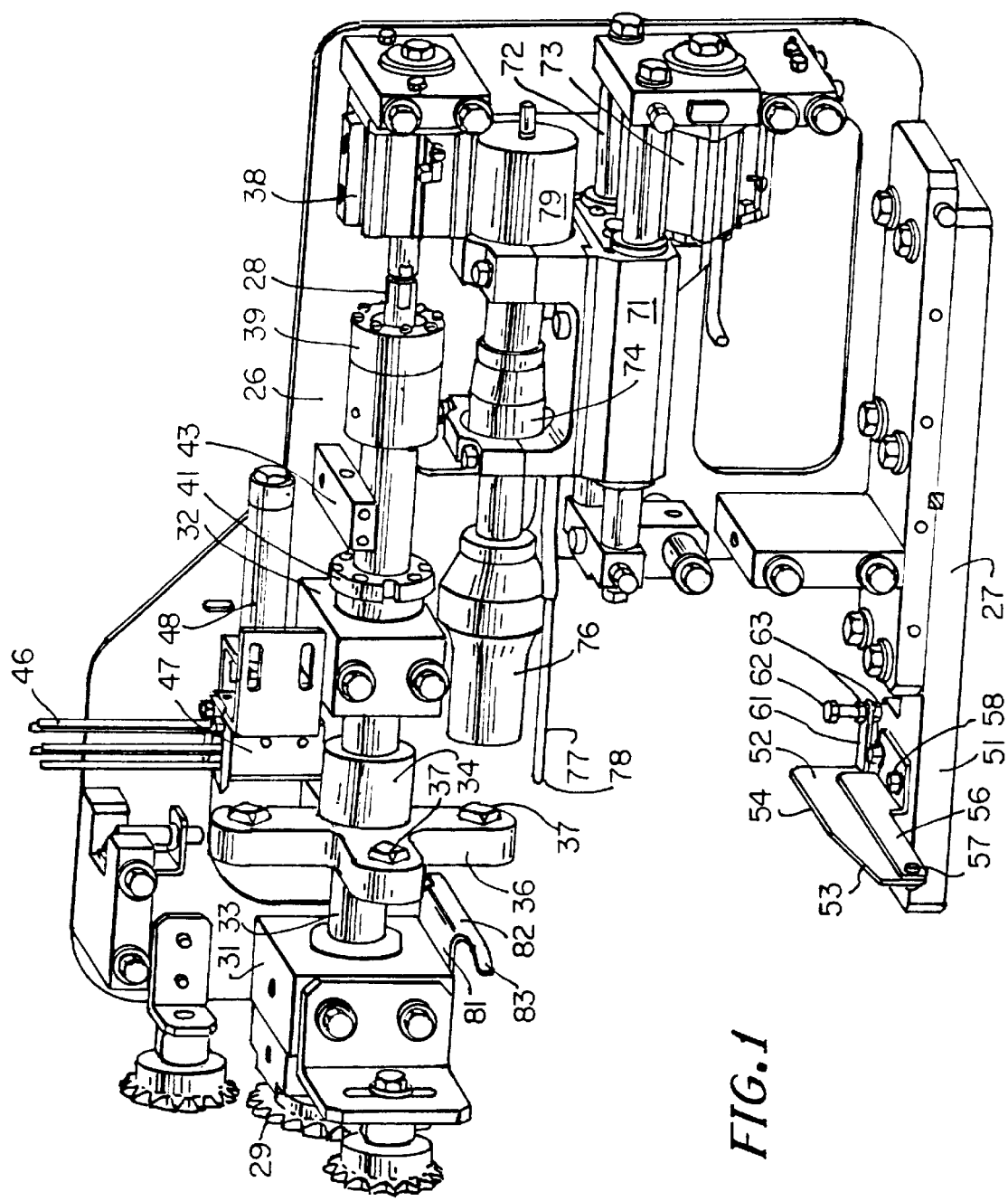
FIG. 1 is a perspective view showing the fitment application station from one direction with portions of the equipment removed.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Carton 11 is of a coated paperboard stock having a square or rectangular cross-section and, at the application station, having an open top. Panel 12 on one side of carton 11 is formed with an aperture 13. At right angles to the panel 12 are leading and trailing sides 14 and 16, respectively.

Fitment 21, as well as carton 11, are subject to wide variation in structure. As illustrated, fitment 21 has a peripheral flange 22 at one end and a spout 23 projecting outwardly thereof dimensioned so that the fitment 21 fits through aperture 13 and the flange 22 engages the inside of panel 12 surrounding aperture 13.

The application station is illustrated in the accompanying drawings. As shown, there is a vertical frame 26 and a horizontal frame projecting from the lower edge of frame 26. Mounted horizontally near the top of frame 26 is stationary shaft 28. Mounted on shaft 28 is a rotating and reciprocable sleeve 33. At one end of sleeve 33 is a sprocket 29 which is driven by means not illustrated but well understood in this art, in timed relation to the intermittent movement of the conveyor (not shown) which conveys the cartons 11 to the application station. Sleeve 33 is supported at its outer end by outer bearing block 31 fixed to frame 26 and by inner bearing block 32, likewise attached to frame 26. Mounted on shaft 28 is an anvil 34 having preferably four radial arms 36 on the outer ends of each of which is a spud 37. At the end of sleeve 33 opposite sprocket 29 is an air cylinder 38 keyed to a coupler 39 which causes the sleeve 33 to reciprocate horizontally, preferably when shaft 28 is stationary.

Mounted on sleeve 33 is an index disk 41 having four holes 42 corresponding to arms 36. Mounted on frame 26 is a horizontally disposed stationary block 43 which has a locating pin 44 formed with a rounded outer end. When the anvil 34 reciprocates to the right as viewed in FIG. 1, pin 44 enters one of the holes 42 and accurately aligns the spud 37 carrying a fitment 21 (not shown in FIG. 1) in downmost vertical position and in accurate alignment with the hole 13 in carton 11.

Fitments 21 are conveyed from a source not shown but well known in this art down a chute 46 of well known construction to a fitment box 47 where they are fed out one at a time by cylinder 48 onto the spud 37 which is uppermost at the particular time. The fitment is held on the spud as the anvil 34 reciprocates away from the box 47 and the next fitment falls into place in box 47. Intermittent rotation of sleeve 33 carries the fitment to vertically downmost position inside carton 11.

In accordance with the present invention, ramp 52 is vertically positioned on conveyor bed 51 (the details of the conveyor not being illustrated because they are subject to wide variation and are well understood in the filler art). Ramp 52 has an inclined upper edge 53 which lifts the carton upwardly and a flat horizontal portion 54 located immediately under sleeve 33. Ramp 52 is mounted on a vertical support 56 by means of a pivot 57, support 56 being attached to the bed 51 by hold down 58. Extending horizontally relative to ramp 52 is an extension 61 through which extends an adjustment screw 62 which engages bed 51 and is held in position by lock nuts 63. Thus even when the conveyor is advancing, adjustment of screw 62 adjusts the height of ramp 52.

Likewise mounted on frame 26 is a welding carriage 71 which reciprocates horizontally with respect thereto on way shafts 72 mounted on frame 26. Carriage 71 is caused to reciprocate horizontally by cylinder 73. Projecting from carriage 71 is a horn support 74 on which is located a welding horn 76 (preferably ultrasonically activated by activator 79).

Extending toward anvil 34 are horizontally disposed carton guides 77 which comprise rods having outwardly curved entrance ends 78. As the welding horn 76 approaches the carton at the applicator station, the guides 77 first engage the leading and trailing sides of the carton and accurately locate the same horizontally relative to the direction of movement of the cartons so that the aperture 13 is accurately aligned with the fitment 21.

The carton 11 is supported by a back in plate 81 attached to bearing block 31 or other convenient location. Plate 81 has a vertical downward bent stretch 82 which engages the side of the carton opposite panel 12. In order to facilitate movement of the carton, there are curved entrances 83 on either end of stretch 82.

OPERATION

Figure 2:
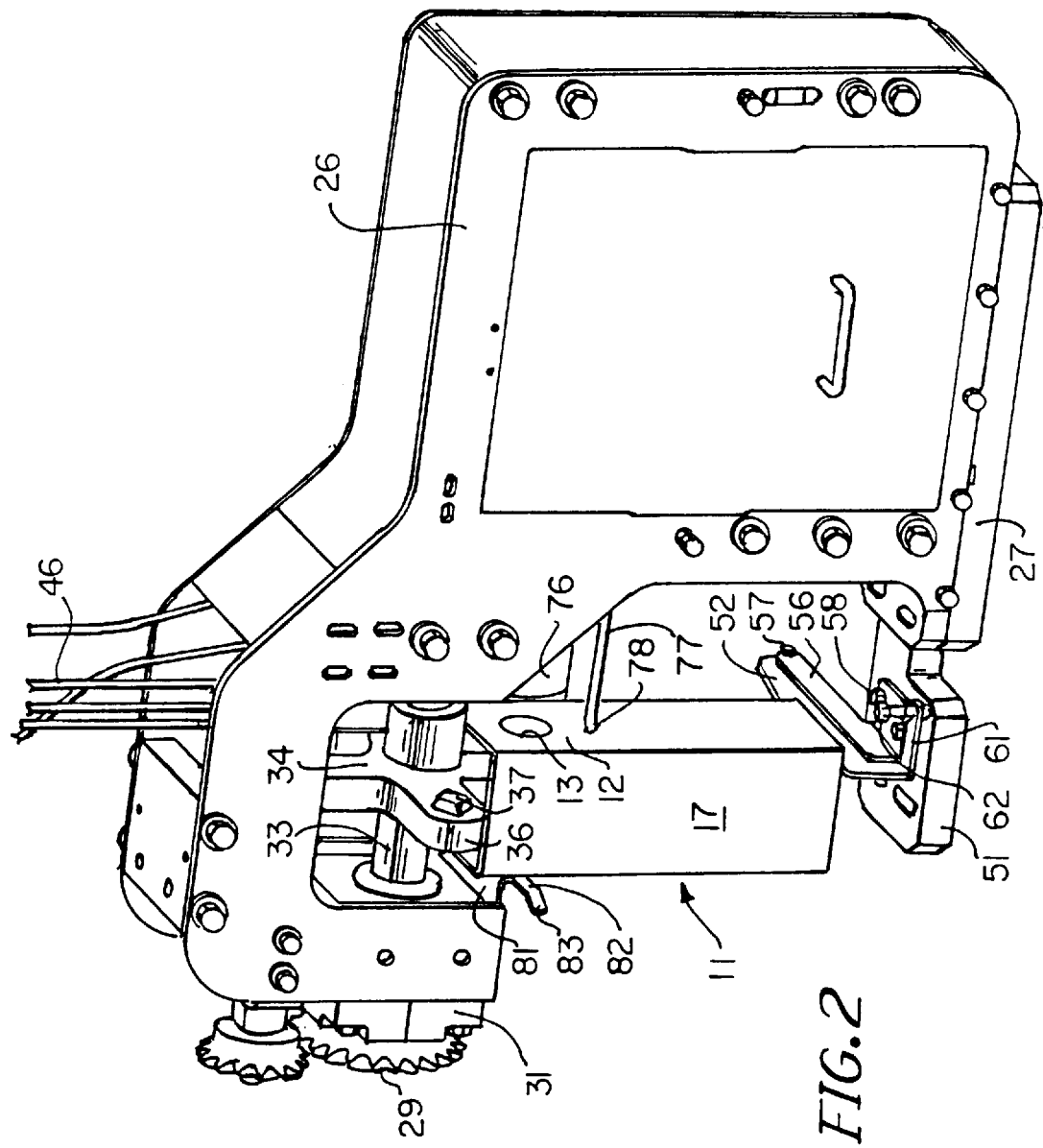
FIG. 2 is a perspective view of the invention from an opposite direction with some of the parts which are removed in FIG. 1 restored.
Figure 3:
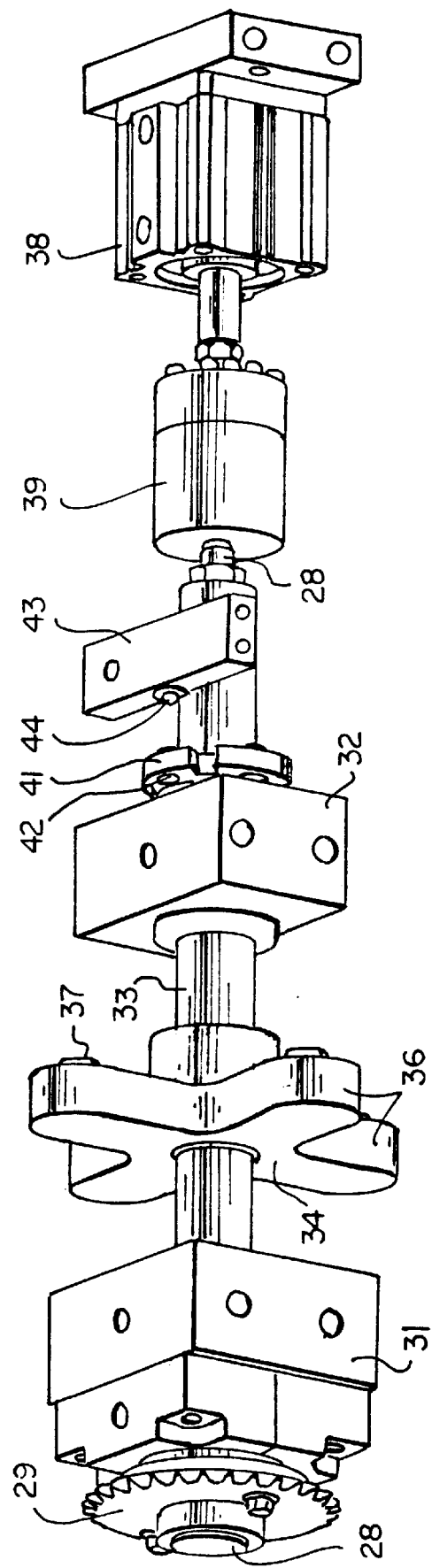
FIG. 3 is a perspective view of the anvil shaft and associated parts.
Figure 4:
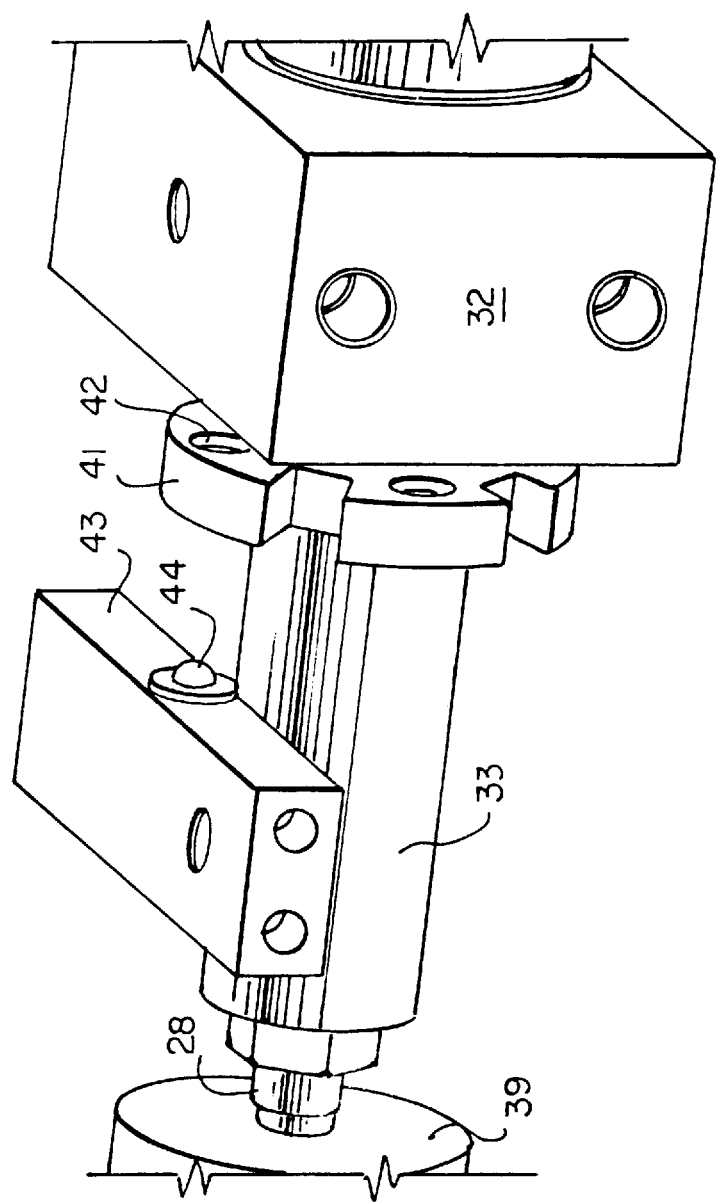
FIG. 4 is an enlarged fragmentary perspective view of a portion of FIG. 3 taken from a different angle.
Figure 5:
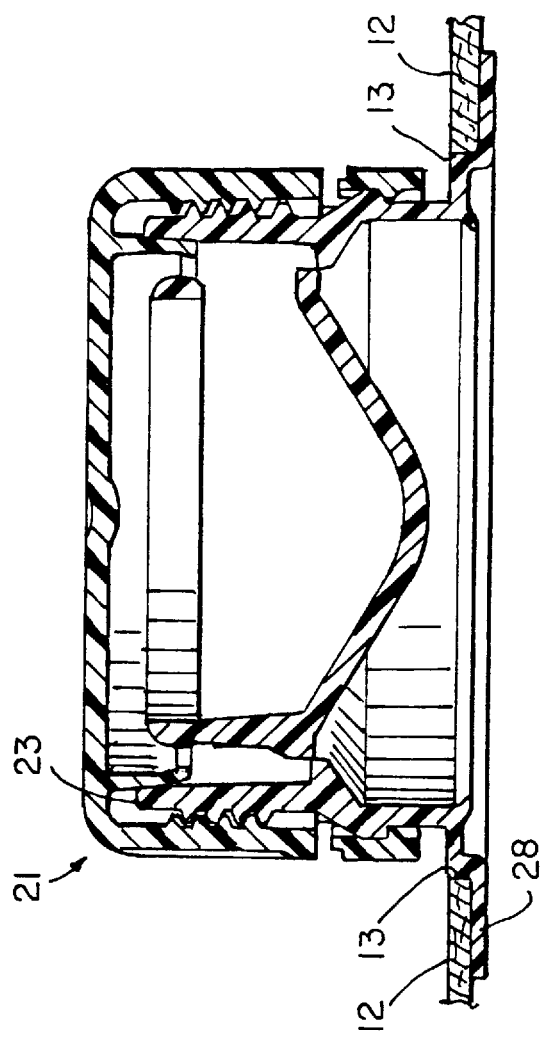
FIG. 5 is a sectional view through a representative fitment and associated carton panel.

Cartons 11 having open ends uppermost are advanced substantially horizontally from left to right as viewed in FIG. 1 (and in the opposite direction as viewed in FIG. 2). The bottoms of cartons 11 are engaged as they approach the attachment station by ramp 52 slanted inclined edge 53 so that they are lifted to proper elevation. Prior to arrival of the carton 11 at the attachment station a fitment 21 has been attached to one of the spuds 37 of anvil 34. As the carton approaches the attachment station, the arm 36 carrying the fitment enters the top of the carton 11 so that the spout 23 thereof is in alignment with aperture 13. There is a slight play between the position of the sleeve 33 and the shaft 28. Hence, as the locating pin 44 enters the appropriate hole 42 in disk 41, the anvil 34 is accurately positioned so that the spud 37 carrying the fitment 21 is in its vertically downmost position aligned with aperture 13. Anvil 34 then reciprocates to the right as viewed in FIG. 1 so that the spud 37 pushes the spout 23 out through the aperture 13 and the flange 22 engages the inside of panel 12. Simultaneously, carriage 71 advances the welding horn 76 toward the carton. As the horn 76 approaches welding position, the carton guides 77 align the carton 11 horizontally relative to the horn 76. Actuator 79 ultrasonically welds the flange 22 to the inside of the carton. Thereupon the various reciprocating parts reverse operation and the next carton is positioned at the attachment station. As the welded carton leaves the attachment station, a depressor bracket pushes the carton down to its original level before it encountered the ramp 52.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a fitment applicator for attaching fitments having a peripheral flange at one end and a spout at an opposite end to an open-ended carton having a panel formed with an aperture, said applicator having a conveyor bed along which a carton advances substantially horizontally parallel to a first substantially vertical plane, a substantially horizontal shaft substantially perpendicular to said first plane, an anvil mounted for rotation with said shaft, said anvil having a plurality of radial arms, means for securing fitments to said arms, means for intermittently rotating said shaft to deposit a fitment inside a carton, means for reciprocating said anvil axially to push an opposite end of a fitment out said aperture, a welding horn mounted on a carriage means for reciprocating said carriage horizontally parallel to said shaft in alignment with said aperture, the improvement which comprises a disk mounted for rotation with said anvil formed with holes corresponding to said arms and a stationary pin positioned to fit into a hole as said anvil reciprocates to accurately locate said fitment aligned with said aperture.

2. The improvement according to claim 1 in which said anvil is mounted for limited angular movement relative to said shaft and said disk is fixed for rotative and reciprocating movement with said anvil.

3. The improvement according to claim 2 which further comprises a sleeve on said shaft, said anvil and said disk being fixed to said sleeve.

4. The improvement according to claim 1 which further comprises a spud adjacent an outer end of each said arm, said spud shaped to detachably engage a fitment.

5. The improvement according to claim 4 which further comprises a fitment terminal station, means for delivery fitments to said station and means at said station for pushing one fitment at a time out of said station onto a spud.

6. In a fitment applicator for attaching fitments having a peripheral flange at one end and a spout at an opposite end to a paperboard open-ended carton having a panel formed with an aperture, said applicator having a conveyor bed along which a carton advances substantially horizontally parallel to a first substantially vertical plane, a substantially horizontal shaft substantially perpendicular to said first plane, an anvil mounted for rotation with said shaft, said anvil having a plurality of radial arms, means for securing fitments to said arms, means for intermittently rotating said shaft to deposit a fitment inside a carton, means for reciprocating said anvil axially to push an opposite end of a fitment out said aperture, a welding horn mounted on a carriage means for reciprocating said carriage horizontally parallel to said shaft in alignment with said aperture, the improvement which comprises a ramp on said bed positioned to engage the bottom of each said carton as it reaches said applicator to raise said carton to preselected elevation.

7. The improvement of claim 6 in which said ramp is vertically disposed and has an upper edge, said upper edge having an inclined portion and a flat portion.

8. The improvement of claim 6 which further comprises means for adjusting the position of said ramp.

9. The improvement of claim 6 which further comprises a support fixed to said bed, pivot means attaching said ramp to said support, an extension on said ramp, an adjustment screw bearing against said bed for raising and lowering said extension and thereby adjusting the elevation of said ramp.

10. In a fitment applicator for attaching fitments having a peripheral flange at one end and a spout at an opposite end to a paperboard open-ended carton having a panel formed with an aperture, said applicator having a conveyor bed along which a carton advances substantially horizontally parallel to a first substantially vertical plane, substantially horizontal shaft substantially perpendicular to said first plane, an anvil mounted for rotation with said shaft, said anvil having a plurality of radial arms, means for securing fitments to said arms, means for intermittently rotating said shaft to deposit a fitment inside a carton, means for reciprocating said anvil axially to push an opposite end of a fitment out said aperture, a welding horn mounted on a carriage means for reciprocating said carriage horizontally parallel to said shaft in alignment with said aperture, the improvement which comprises a first and a second substantially horizontal carton guide fixed to said carriage, said guides being spaced and positioned to engage opposite sides of said carton as said horn advances to locate said carton horizontally relative to said horn.

11. The improvement of claim 10 in which the distal ends of said guides are formed with outward, curved portion so that a curved portion first engages said carton if said carton is not initially accurately located relative to said horn.

12. The improvement of claim 10 which further comprises a backing plate fixed opposite said carriage and positioned to engage and support a side of said carton opposite said panel formed with said aperture.

13. The improvement of claim 10 further comprises a ramp on said bed positioned to engage the bottom of each said carton as it reaches said applicator to raise said carton to a preselected elevation.

14. The improvement of claim 13 which further comprises means for adjusting the position of said ramp.

15. The improvement of claim 10 which further comprises a first and a second substantially horizontal carton guide fixed to said carriage, said guides being spaced and positioned to engage opposite sides of said carton as said horn advances to locate said carton horizontally relative to said horn.

16. The improvement of claim 15 which further comprises a backing plate fixed opposite said carriage and positioned to engage and support a side of said carton opposite said panel formed with said aperture.

17. The improvement of claim 13 which further comprises a first and a second substantially horizontal carton guide fixed to said carriage, said guides being spaced and positioned to engage opposite sides of said carton as said horn advances to locate said carton horizontally relative to said horn.

* * * * *